United States Patent
Fukui et al.

(10) Patent No.: US 9,891,508 B2
(45) Date of Patent: Feb. 13, 2018

(54) PROJECTION-TYPE IMAGE DISPLAY DEVICE

(71) Applicant: Hitachi Maxell, Ltd., Ibaraki-shi, Osaka (JP)

(72) Inventors: Masayuki Fukui, Ibaraki (JP); Kazuomi Kaneko, Ibaraki (JP)

(73) Assignee: Hitachi Maxell, Ltd., Tokyo (JP)

( * ) Notice: Subject to any disclaimer, the term of this patent is extended or adjusted under 35 U.S.C. 154(b) by 30 days.

(21) Appl. No.: 14/917,613

(22) PCT Filed: Sep. 13, 2013

(86) PCT No.: PCT/JP2013/074896
§ 371 (c)(1),
(2) Date: Mar. 9, 2016

(87) PCT Pub. No.: WO2015/037138
PCT Pub. Date: Mar. 19, 2015

(65) Prior Publication Data
US 2016/0223889 A1    Aug. 4, 2016

(51) Int. Cl.
*G03B 21/14*    (2006.01)
*G03B 21/28*    (2006.01)
*G03B 21/30*    (2006.01)

(52) U.S. Cl.
CPC .......... *G03B 21/145* (2013.01); *G03B 21/28* (2013.01); *G03B 21/30* (2013.01)

(58) Field of Classification Search
CPC ........ G03B 21/14; G03B 21/28; G03B 21/30; G03B 21/00; H04N 5/74
See application file for complete search history.

(56) References Cited

U.S. PATENT DOCUMENTS 8,033,229 B1    10/2011  McCanna
2003/0174296 A1    9/2003  Morishita
(Continued)

FOREIGN PATENT DOCUMENTS

JP    10-260473 A    9/1998
JP    3057778 B    4/2000
(Continued)

OTHER PUBLICATIONS

International Search Report of PCT/JP2013/074896 dated Nov. 26, 2013.
(Continued)

*Primary Examiner* — Sultan Chowdhury
*Assistant Examiner* — Danell L Owens
(74) *Attorney, Agent, or Firm* — Mattingly & Malur, PC

(57) ABSTRACT

A optical system including a projection lens system 102 for emitting light image to be enlarging-projected is accommodated inside a frame 1 configured with a lower case 2 and an upper case 3, a reflecting mirror 32 which enlarging-projects the image light emitted from the optical system toward a screen S or a top surface of a table T as a display plane is openably attached to a portion of the upper case of the frame, the device can be installed by a bottom surface of the lower case or one side surface thereof, a stand leg 5 is accommodated integrally with the case and extractably in the one side surface of the lower case, and the stand leg has a form (an inclination angle, a ratchet mechanism, a locking mechanism, and the like) satisfying an installation condition for vertically erected arrangement in the extracted state.

9 Claims, 9 Drawing Sheets

(56) References Cited

U.S. PATENT DOCUMENTS

| | | |
|---|---|---|
| 2008/0204673 A1 | 8/2008 | Hirata et al. |
| 2008/0212038 A1* | 9/2008 | Hirata .................... G02B 17/08 353/70 |
| 2008/0218707 A1* | 9/2008 | Adachi ................ G03B 21/145 353/98 |
| 2009/0122274 A1 | 5/2009 | Saito |
| 2010/0103384 A1* | 4/2010 | Chang .................... G03B 21/28 353/70 |
| 2010/0321643 A1 | 12/2010 | Ichikawa et al. |
| 2012/0008265 A1 | 1/2012 | Tanaka et al. |
| 2013/0114050 A1 | 5/2013 | Yamada et al. |

FOREIGN PATENT DOCUMENTS

| | | |
|---|---|---|
| JP | 3087733 U | 8/2002 |
| JP | 2005-180555 A | 7/2005 |
| JP | 2008-250283 A | 10/2008 |
| JP | 2009-122296 A | 6/2009 |
| JP | 2012-137707 A | 7/2012 |
| JP | 2012-234119 A | 11/2012 |
| JP | 2013-008044 A | 1/2013 |
| JP | 2013-097341 A | 5/2013 |

OTHER PUBLICATIONS

Extended European Search Report received in corresponding European Application No. 13893495.5 dated Apr. 5, 2017.

* cited by examiner

F I G. 5
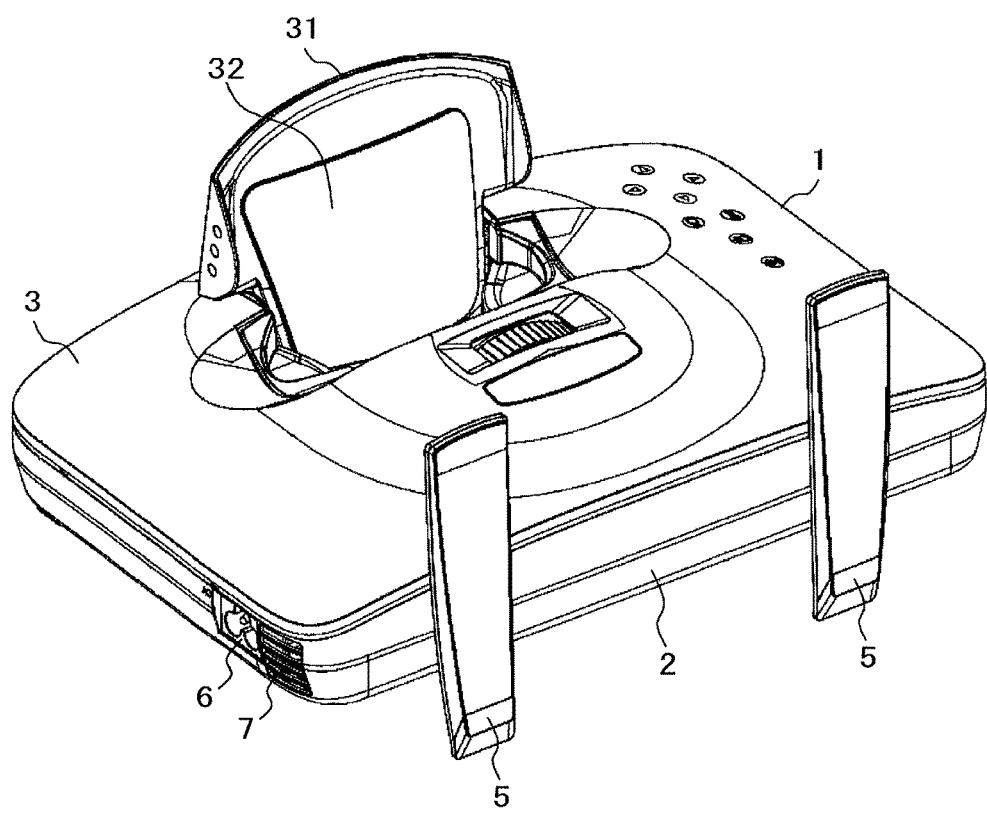

(A)

(B)

PROJECTION-TYPE IMAGE DISPLAY DEVICE

TECHNICAL FIELD

The present invention relates to a projection-type image display device.

BACKGROUND ART

A projection-type image display device is applied to a large-sized enlarging-projection television set and is widely used as means for receiving an image signal as an input from the outside, enlarging the image, and projecting the image on a panel, a wall, or the like as disclosed in, for example, Patent Document 1 mentioned below. In addition, in recent years, besides displaying the image signal from a personal computer (PC), there is expected a portability for easily projecting image or the like, obtained by a mobile terminal such as an iphone or an iPad mini on an indoor wall, a surface of a desk, or the like. Therefore, the device needs to be arrangeable on, for example, a desk in various forms such as so-called horizontally-placed arrangement where the bottom surface of the frame constituting the main body is arranged so as to be parallel to the surface of the desk or so-called vertically-placed arrangement where one side surface of the frame is arranged so as to be parallel to the surface of the desk.

In addition, according to Patent Document 2 mentioned below, there is known a projector device provided with a support member for rotatably supporting a main body unit of a liquid crystal projector to facilitate adjusting a projection angle.

CITATION LIST

Patent Document

Patent Document 1: JP 2013-8044 A
Patent Document 2: JP 3057778 B1

SUMMARY OF THE INVENTION

Problems to be Solved by the Invention

However, according to Patent Document 1, particularly, in a case where the device is arranged to be vertically placed, there is a problem of stability thereof, and thus, there is a possibility that a problem in that desired projection performance cannot be obtained may occur. In addition, although Patent Document 2 discloses that a support member for rotatably supporting a main body unit of a projector is provided as illustrated in FIG. 1, since the support member is attached on the bottom surface of the main body unit, in a case where the projector device is transported, the support member needs to be transported together, and thus, the structure is not suitable for a projection-type image display device requiring a small size.

Therefore, in view of the above-described problems of the related art, the present invention is to provide a practically excellent projection-type image display device requiring portability and being capable of setting an arrangement state appropriately according to a use state (for example, an image display situation or the like).

Solutions to Problems

In order to achieve the object of the present invention, there is provided a projection-type image display device where an optical system including at least a projection lens and for emitting image light to be enlarging-projected is accommodated inside a frame configured with a lower case and an upper case and an enlarging projection means which enlarging-projects the image light emitted from the optical system toward a display plane is openably attached to a portion of the upper case of the frame, wherein the device can be installed by a bottom surface of the lower case or one side surface thereof, wherein a stand leg is accommodated integrally with the case and extractably in the one side surface of the lower case, and wherein the stand leg has a form satisfying an installation condition for vertically erected arrangement where the one side surface of the device becomes a bottom surface in the extracted state.

Effects of the Invention

According to the above-described present invention, it is possible to obtain an excellent effect in that it is possible to provide, as a projection-type image display device having portability, a practically excellent projection-type image display device being capable of changing an arrangement state appropriately according to a use situation by simple manipulation.

BRIEF DESCRIPTION OF THE DRAWINGS

FIG. 5 is a perspective diagram illustrating a state that a pair of stand legs are extracted from the reflective projection-type image display device.

MODE FOR CARRYING OUT THE INVENTION

Hereinafter, a projection-type image display device will be described in detail with reference to the attached drawings. Herein, as an embodiment, particularly, a reflective projection-type image display device which enlarging-projects to-be-projected image light by a reflecting mirror constituting a portion of a projection optical system will be mainly described.

<Overall Configuration of Projection-Type Image Display Device>

Figure 1:
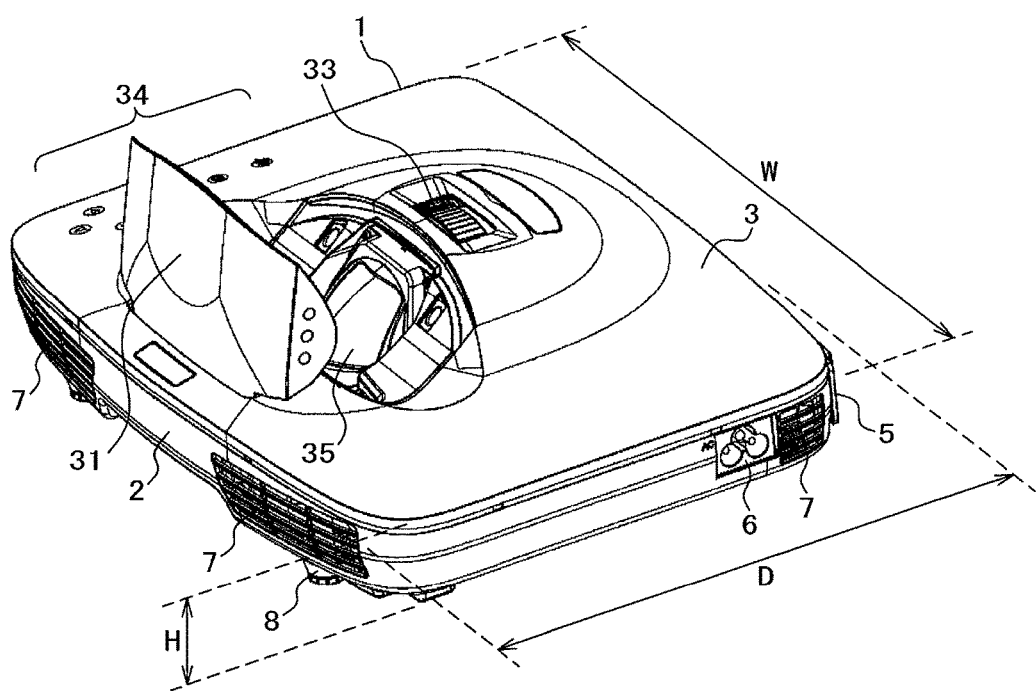
FIG. 1 is a perspective diagram illustrating outer appearance of a reflective projection-type image display device.
Figure 2:
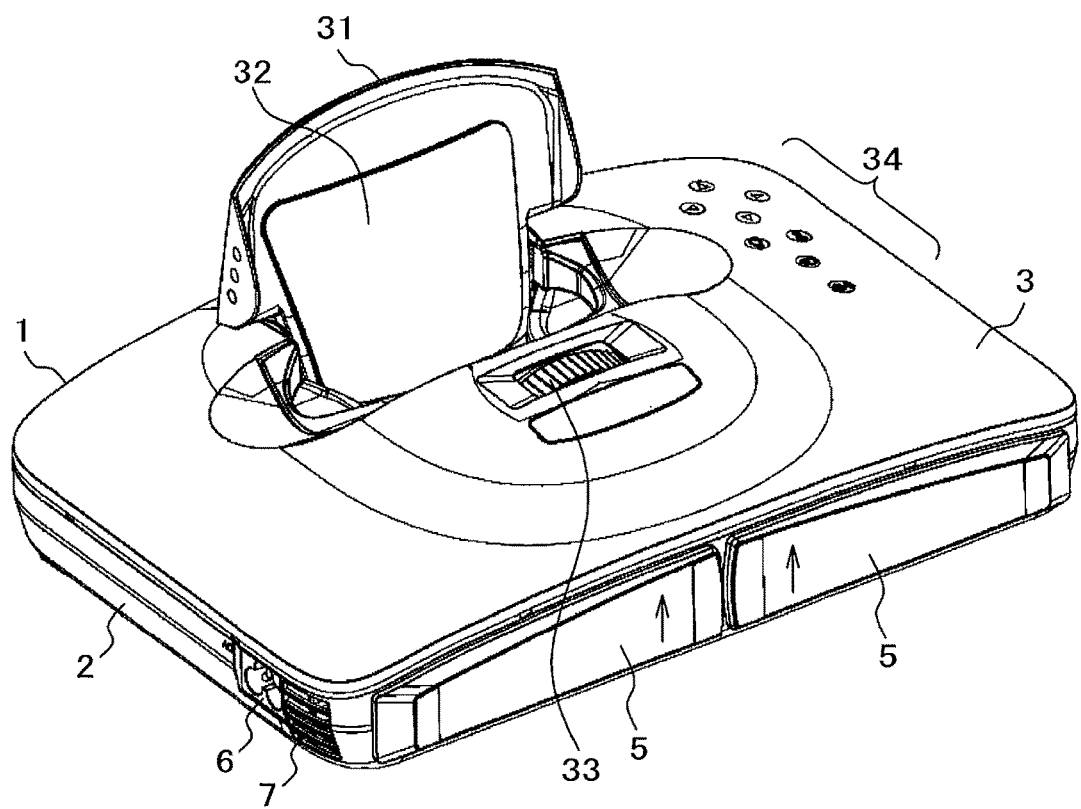
FIG. 2 is a perspective diagram illustrating outer appearance of the reflective projection-type image display device as viewed at a different angle.

First, FIGS. 1 and 2 are perspective diagrams illustrating outer appearance of the projection-type image display device as viewed at different angles. In these figures, in the projection-type image display device, a main body 1 is configured with a lower case 2 having a substantially rectangular outer shape which is obtained by integrally forming four side surfaces surrounding the bottom surface and an upper case 3 which is disposed on the top surface to be fixed.

A substantially central portion of the upper case 3 that is the top surface of the projection-type image display device is formed to be swelled up in a so-called hill-like shape (convex portion), and a portion thereof, that is, an openable mirror cover 31 is attached so as to be separate from other portions and to be rotatable outwards by only a predetermined angle. As a portion of the optical system, a reflecting mirror (freeform surface mirror) 32 having a convex shape formed to be rotationally asymmetric is attached to the inner side of the openable mirror cover 31 (refer to FIG. 2), mainly, a lens optical system (not illustrated) is disposed inside the convex portion of the above-described cover 3, and an opening 35 (refer to FIG. 1) is formed to guide the projection light to the outside (in FIG. 1, only the last part of the lens optical system is illustrated through the opening 35). A rotation knob 33 for focus adjustment, a touch-panel type manipulator 34 configured with various push buttons for inputting, and the like are attached on the front surface of the upper case 3.

In the projection-type image display device, a pair of stand legs 5 and 5 formed integrally with the main body and having a structure which can be installed according to a use form of the projection-type image display device are attached on one side surface (side surface opposite to the side where the openable mirror cover 31 is installed) of the lower case 2 having a substantially rectangular outer shape. A power inlet 6 into which a power cable for supplying AC power from a commercial power supply to the device is inserted, an intake/exhaust opening 7 which is an opening for intaking/exhausting air for cooling the inner portion from/to the outside, a port plate (not illustrated) for inputting image from the outside to be projected and displayed by the projection-type image display device, and the like are attached on the other side surface of the lower case 2. An intake/exhaust opening (not illustrated) for cooling air, tilt adjusting legs 8 for adjusting an installation angle of the device, and the like are attached on the bottom surface of the lower case 2.

With respect to the outer appearance dimensions of the above-described projection-type image display device, as an example, a width=W, a depth=D, and a height=H indicated by the arrows in FIG. 1 are set to W=265 mm, D=200 mm, and H=70 mm, respectively, so as to be the dimensions corresponding to the so-called A4 size. In addition, a weight of the entire device is set to about 1 kg. Namely, the projection-type image display device is designed so that the device together with a mobile terminal or the like can be accommodated in a briefcase or a bag to be portable and so that the device can be easily installed on a desk, a wall, or a surface of a table at a transport site to perform projection.

<Optical System and Others>

Figure 3:
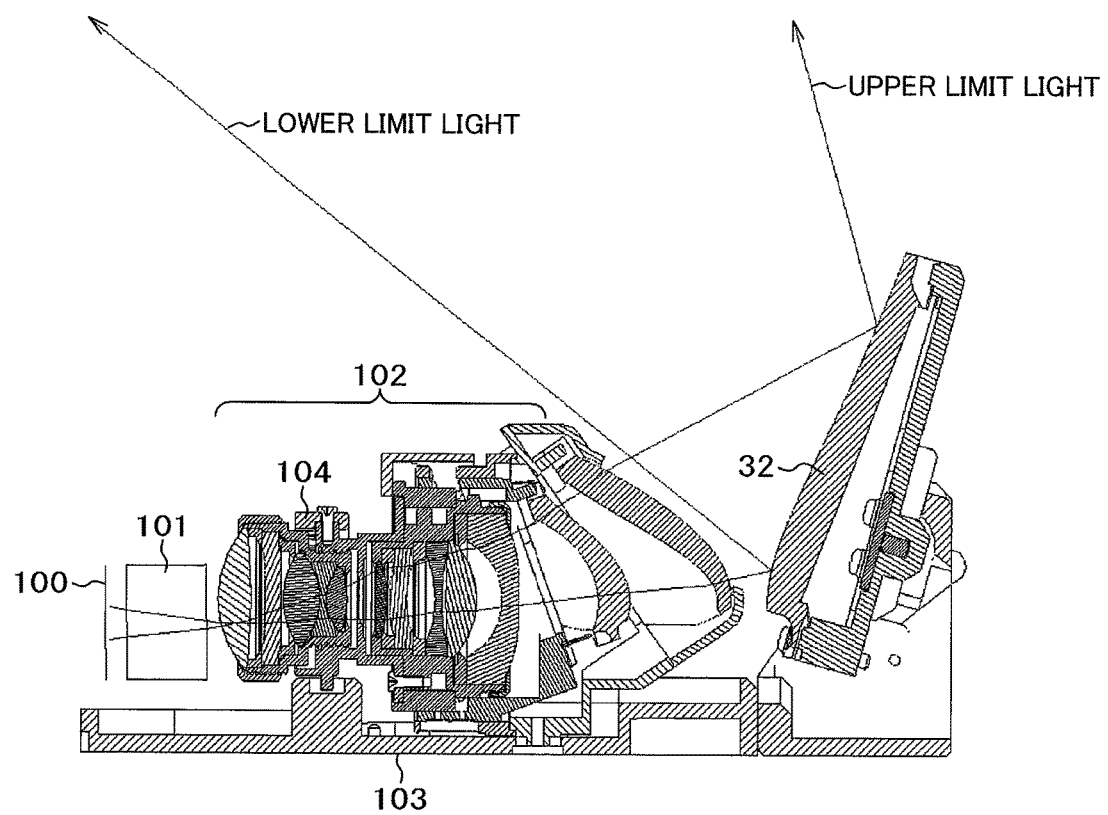
FIG. 3 is a partial enlarged cross-sectional diagram illustrating an example of an optical system of the reflective projection-type image display device.

FIG. 3 is a cross-sectional diagram illustrating an example of a configuration of the above-described optical system.

Light from a light source configured with, for example, a semiconductor laser (not illustrated) is modulated by a reflection-type optical modulation device configured with, for example, a micromirror such as DLP (Digital Light Processing) (registered trade mark) or a reflection-type liquid crystal panel (LCOS (registered trade mark); Liquid Crystal On Silicon) or a transmission type optical modulation device 100 configured with a liquid crystal panel or the like according to an image signal (for example, an image signal from a mobile terminal) from the outside. The obtained image is combined by a TIP prism 101 and is projected through a projection lens system 102 configured with a plurality of lenses onto a reflecting mirror 32 to be reflected on the surface thereof, so that enlarging projection is performed. The projection lens system 102 includes various lenses including a lens having a freeform surface shape being not rotationally symmetric which is necessary for correction of various types of distortion involved with image enlarging projection, for example, distortion caused by oblique incidence or trapezoidal distortion. The projection lens system 102 is movably mounted on a projection lens base 103, and focusing performance can be adjusted by moving a portion of lenses of or a lens group of the projection lens system 102 in the up/down direction of the figure by a function of a lens adjustment mechanism 104.

In this figure, light is enlarged by the above-described optical system and is projected onto the reflecting mirror 32 (refer to light lines in the figure) to be reflected on the surface and is projected onto a projection plane, for example, a screen, a wall, a ceiling, a desk, a table, or the like. Upper limit light LU and lower limit light LD of the image light are illustrated by arrows in the figure.

In addition, the optical system configured with the projection lens system 102 including a freeform surface lens as the reflecting mirror 32 is employed, so that excellent projection performance capable of projecting and displaying a sufficiently enlarged image is secured even through the distance from the device to the image projection plane is small. For example, in a case where the projection-type image display device is arranged in the state that a front end thereof is in contact with the image projection plane and image projection is performed in this state, a 30.5 inch×17.2 inch screen (diagonal 35-inch screen size 16:9) can be obtained.

In addition, for example, a power supply unit (not illustrated) for supplying necessary power to components of the device, a so-called cooling device such as an axial flow fan or a sirocco fan for cooling the components involved with heat generation, an LED illumination unit including LEDs for emitting green (G) light, red (R) light, and blue (B) light, a control unit including a CPU and the like of controlling operations of the components, a processor of performing an image process or the like, and the like are appropriately disposed and accommodated inside the lower case 2 and the upper case 3 that are the frames of the projection-type image display device.

Subsequently, the use form of the projection-type image display device will be described hereinafter. Namely, the projection-type image display device is basically used (A) in a horizontally-placed use form where a device main body having a plate-shaped outer appearance is arranged on a desk, a table, or a surface of a floor to be horizontally placed and an image is projected on to a surface (for example, installation screen or wall or the like) substantially vertical thereto and (B) in a vertically-placed use form where the projection-type image display device is used in a state that the device is erected in the vertical direction and where the device main body is arranged on a desk, a table, or a surface of a floor to be vertically placed and an image projected on the desk, the table, the surface of the floor, or the like.

<A: Horizontally-Placed Use Form>

Figure 4:
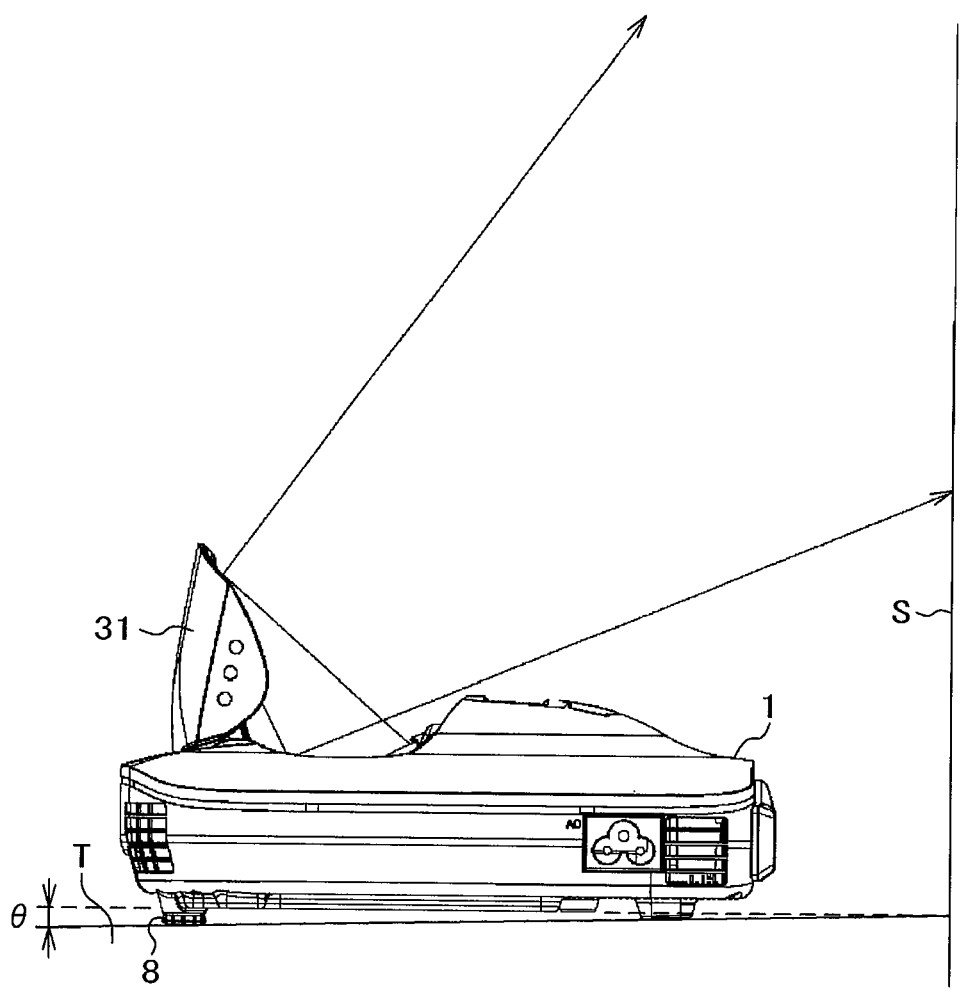
FIG. 4 is a cross-sectional diagram illustrating a horizontally-placed use form of the reflective projection-type image display device.

In this use form, as illustrated in FIG. 1 or FIG. 2 described above, the device main body 1 is arranged, for example, on the surface of the table T to be horizontally placed so that the bottom surface faces down and the openable mirror cover 31 is opened. Next, as illustrated in FIG. 4, the position of the reflecting mirror 32 attached inside the openable mirror cover 31 is adjusted so as to face the screen or wall onto which the image is projected. In this case, due to employment of the optical system configured with the projection lens system including the above-described freeform surface lens, although the distance to the screen S is small (for example, the distance d to the screen S=0 to several tens of centimeters) or the optical system is disposed so as to be adjacent to the screen, a sufficient-size projection image can be obtained. In addition, in a case where a desired focus cannot be obtained due to a change of the projection distance d to the screen S, by appropriately rotating the above-described knob 33 for focus adjustment, the adjustment is performed again.

In addition, as clarified from FIG. 4, the device main body 1 is set in advance so that the main body is arranged to be tilted toward the screen S side by only a small angle θ (for example, θ=1.3 degrees) by a function of the tilt adjusting legs 8 (practically, including other fixing legs 8'). In addition, this is a condition that is set for the design of the above-described reflective projection-type image display device, particularly, the projection optical system, and in some cases, the associated tilt angle may not be involved (that is, θ=0 degree).

<B: Vertically-Placed Use Form>

Figure 6:
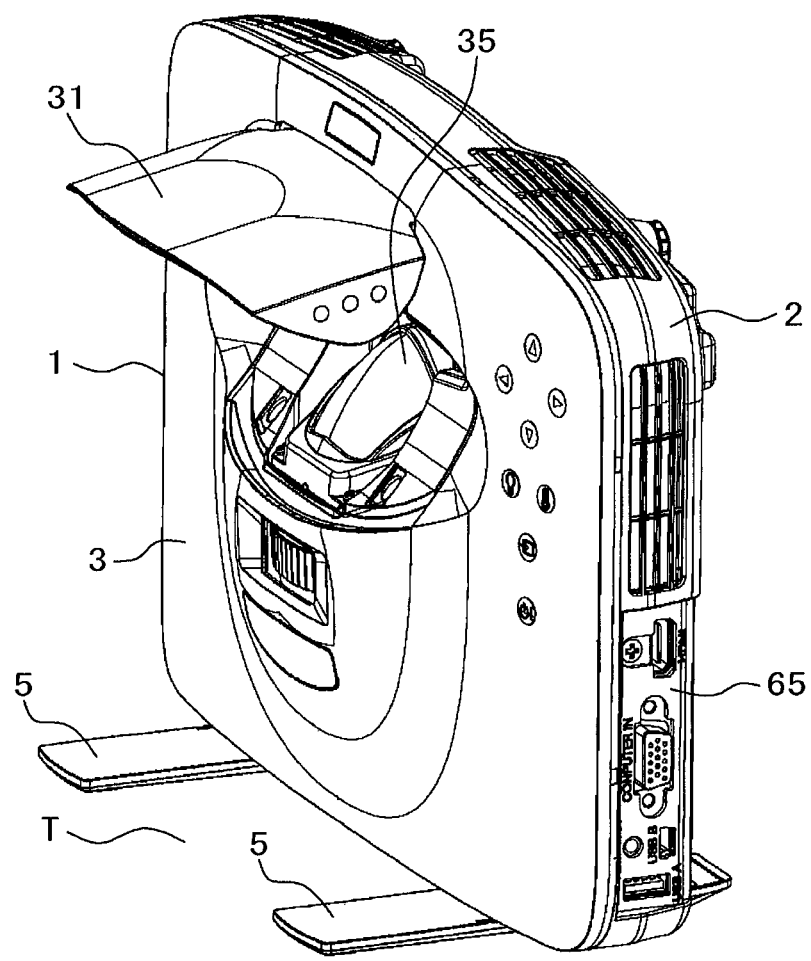
FIG. 6 is a perspective diagram illustrating a state that the pair of stand legs are extracted from the reflective projection-type image display device and the device is arranged to be vertically placed.

In this use form, the pair of stand legs 5 and 5 integrally attached to the main body at one side surface (side opposite to the side where the openable mirror cover 31 is installed) of the lower case 2 are extracted from the device main body 1 in the above-described state of FIG. 2 by rotating in a predetermined direction (refer to the arrows of the figure), so that the state of FIG. 5 is obtained. After that, as illustrated in FIG. 6, the surfaces of the pair of extracted stand legs 5 and 5 are arranged so as to be in contact with, for example, the surface of a desk, so that the device main body 1 is arranged in the vertically-placed use form. In addition, FIG. 6 illustrates, in detail, an example of a port plate 65 attached on the side surface of the lower case 2. Namely, herein, the port plate 65 includes USB ports "USB A" and "USB A", a VGA port "COMPUTER IN" for inputting an image signal from a computer, and an HMDI port.

Figure 7:
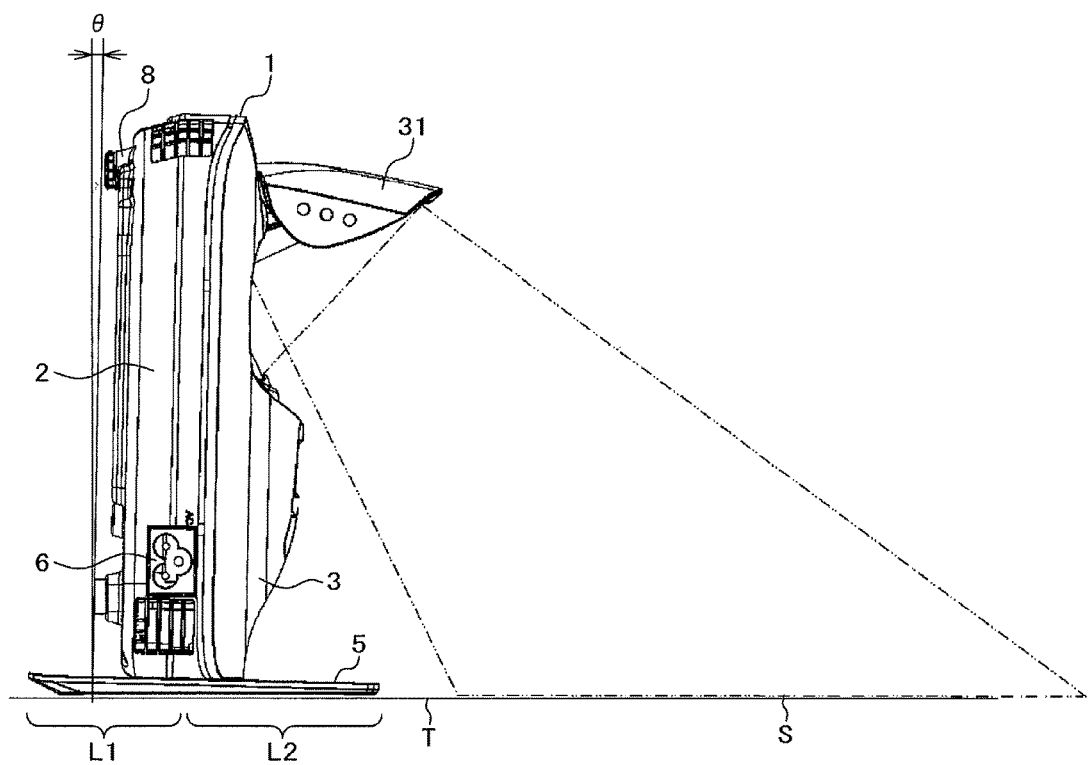
FIG. 7 is a cross-sectional diagram illustrating operations of a case where the reflective projection-type image display device is used in a vertically-placed use form.

FIG. 7 illustrates a side surface of the projection-type image display device in the vertically-placed use form. In this use form, it can be understood that the device main body 1 is retained by the pair of stand legs 5 and 5 and a desired positional relationship with respect to the screen S (herein, coincident with the surface of a table T as an installation site) onto which the image is projected is secured. More specifically, the pair of stand legs 5 and 5 are formed so that the thickness thereof is gradually reduced from the one end (left side of FIG. 7) to the other end, and namely, the legs are inclined. Therefore, similarly to the above-described case, in the horizontally-placed use form, the device main body 1 is arranged to be tilted toward the screen S side by only a small angle θ (for example, θ=1.3 degrees) with respect to the normal line from the screen S (=the surface of the table T) onto which the image is projected. In other words, due to the function of the pair of stand legs 5 and 5 formed integrally with the above-described main body, the projection-type image display device can be set in an appropriate condition according to the use situation including the horizontally-placed use form and the vertically-placed use form, and the required mechanism and the like are included, so that it is possible to provide a practically excellent projection-type image display device.

Namely, in the above-described projection-type image display device, due to the function of the above-described pair of stand legs 5 and 5 formed in a portion of the device, the horizontally-placed use form and the vertically-placed use form are included, and the device can be arranged to be tilted by only a small angle θ with respect to the image projection plane, so that the device secures excellent image projection display performance (for, example, in a case where the tilt angle θ cannot be maintained, there is a problem in that the image which projected onto the projection plane such as the screen is distorted to be a trapezoidal shape). For this reason, in a case where the pair of stand legs 5 and 5 are extracted to be used, a mechanism or the like of moving easily and securely by only a desired angle (for example, 90 degrees) in a predetermined direction (refer to FIG. 7) is required.

Hereinafter, the more detailed structure of the pair of stand legs 5 and 5 in the projection-type image display device will be described more in detail with reference to attached FIGS. 8 to 10.

<Installation Structure of Stand Legs>

Figure 8:
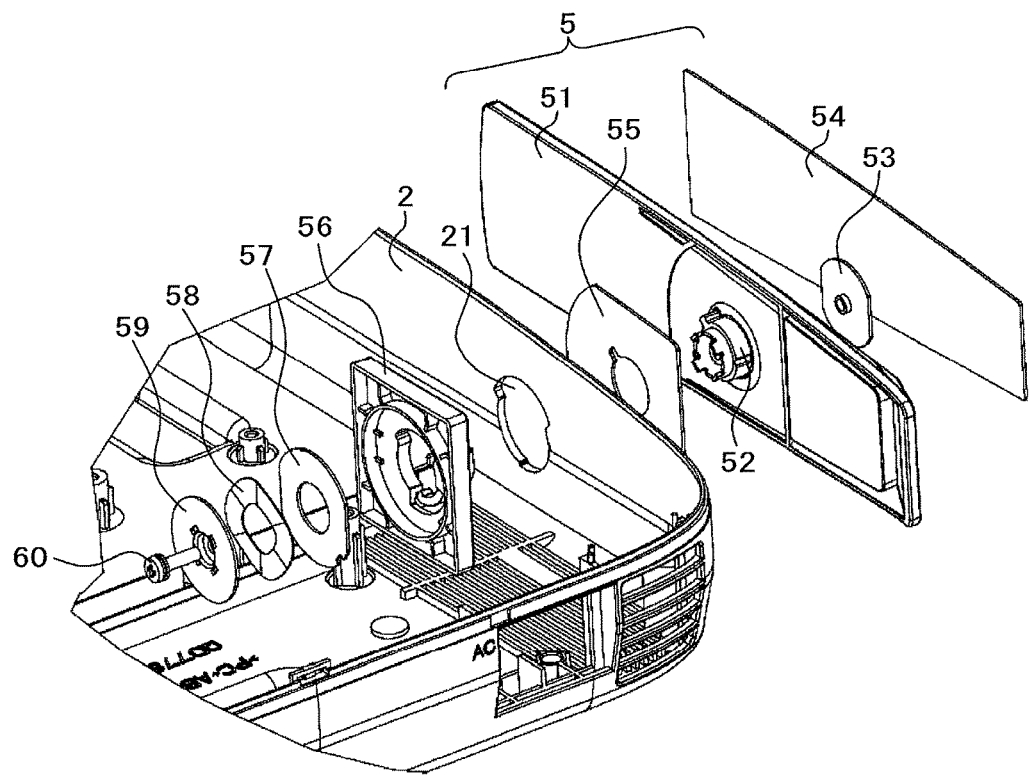
FIG. 8 is a partially enlarged developed perspective diagram illustrating an installation structure of a stand leg to a main body unit of the reflective projection-type image display device.

First, FIG. 8 illustrates the installation structure of the above-described pair of stand legs 5 and 5, particularly, the side surface of the lower case 2 of one of the stand leg. The stand leg 5 is formed by, for example, injection molding of a resin or the like and is configured with a leg main body portion 51 which has an outer appearance shape suitable to the side surface of the lower case 2 and has the above-described desired inclination angle (θ) with respect to the thickness direction, a protrusion 52 which is formed in a portion of a contact surface of the leg main body portion with respect to the side surface of the lower case 2 and has a double-cylindrical outer shape, a washer nut 53 which is attached to the outer surface of the main body portion, a decoration sheet 54 (specifically, a sheet-shaped member where one surface thereof is applied with adhesive in order to hide the washer nut), and the like.

The above-described stand leg 5 is configured so that the protrusion 52 of the leg main body portion 51 is inserted through a through-hole 21 formed at a substantially central portion (=H/2) of the lower case 2 in the height direction to reach the inner portion of the lower case. At this time, preferably, as a member for reducing frictional resistance of the contact surface between the stand leg 5 and the lower case 2, for example, a sliding sheet 55 or the like is interposed.

On the other hand, a block-shaped sliding stopper/lock part 56 is disposed inside the lower case 2. An opening into which the protrusion 52 of the above-described stand leg 5 side is inserted, a ratchet mechanism described below, and the like are integrally formed in the central portion of the sliding stopper/lock part 56. The sliding stopper/lock part 56 is attached to the above-described leg main body portion 51 through a washer 57, a wave washer (washer spring) 58, and another washer 59 (this washer is rotated while following the stand leg 5) by a penetrating screw 60 and is screwed with, specifically, the above-described washer nut 53.

Figure 9:
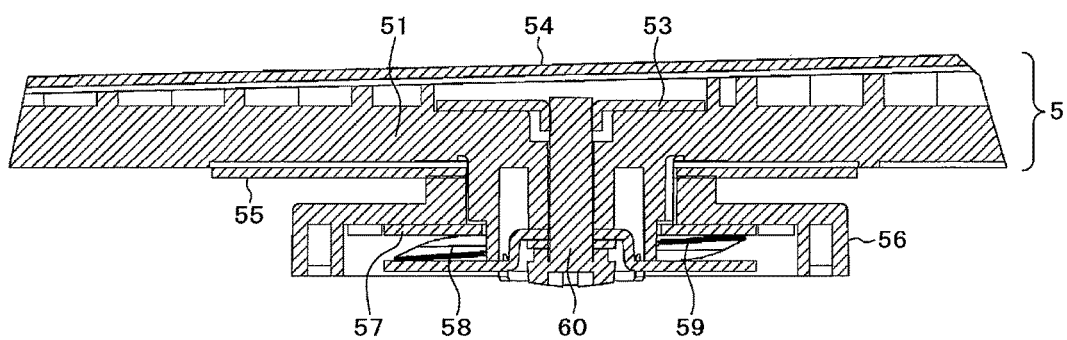
FIG. 9 is a partially enlarged cross-sectional diagram illustrating a cross section of an achieved installation structure of the stand leg.

A cross section of the achieved installation structure of the stand leg having the above-described configuration is illustrated in FIG. 9. FIG. 10 is a partial enlarged diagram illustrating, particularly, the protrusion 52 extending from a portion of the leg main body portion 51 and the sliding stopper/lock part 56 where the protrusion 52 is inserted into the opening formed at the central portion as a center, in order to describe functions and operations of the achieved installation structure of the stand leg.

Figure 10:
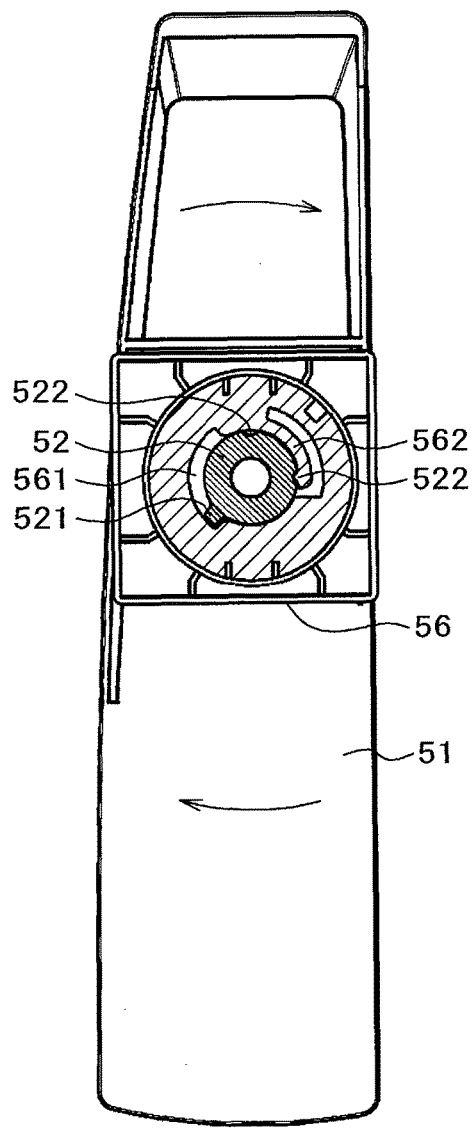
FIG. 10 is a partially enlarged plan diagram illustrating functions and operations of the achieved installation structure of the stand leg.
Figure 10:
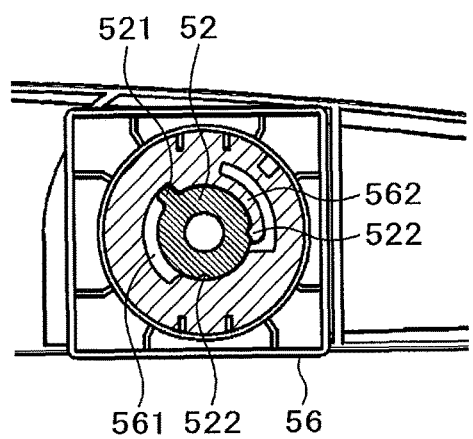

Particularly, as clarified from FIG. 10, a salient 521 and a pair of semicircular recesses 522 and 522 are formed in the outer circumference of the cylindrical protrusion 52 extending from a portion of the leg main body portion 51. On the other hand, the sliding stopper/lock part 56 into which the protrusion 52 is inserted includes a disc-shaped member in the central portion the rectangular main body, and an opening 561 into which the cylindrical protrusion 52 of the leg main body portion 51 is slidably inserted in the circumferential direction is formed in the substantially central portion of the disc-shaped member. The opening 561 is configured as a fan-shaped opening spreading in a predetermined angle (in this example, 90 degrees) so that the salient 521 of the protrusion 52 is rotatable within a predetermined angle range (in this example, 0 degree to 90 degrees). In addition to the above-described opening, the disc-shaped member further includes a so-called ratchet mechanism 562 for stably retaining the protrusion 52 (namely, the stand leg 5) at predetermined angles (in this example, 0 degree and 90 degrees).

Namely, according to the attachment structure of the stand leg including the locking mechanism or the ratchet mechanism by the above-described washer spring, there is no problem of a case where the stand leg is separately configured (for example, unusability caused by transport forgetting), there is no error with respect to the extraction direction in the case of extracting the pair of stand legs 5 and 5 formed in a portion of the projection-type image display device, and stable fixing at a desired extraction angle (that is, 90 degrees) can be performed by checking setting to an optimal position, for example, by using click sound from the above-described ratchet mechanism.

In addition, although the above-described example described the structure where the penetrating screw 60 is attached from the inside, the screw may also be disposed in the outside, and in this case, maintenance or replacement of defective parts is available without opening the frame of the device. In this case, in addition to the above-described other washer 59, a cover part (not illustrated) is further necessary, and the cover part has a function of retaining washer parts in the state that the leg or the screw is missing and of retaining parts not to be scattered inside the device in the case that the leg or the screw is broken. In addition, the leg portions may be configured appropriately corresponding to the user's use so that the leg portion detachment thereof can be selected.

<Length and the Like of Stand Legs>

Although the pair of stand legs 5 and 5 formed in a portion of the projection-type image display device may be designed so as to be, for example, equally distributed (5:5) with respect to the center position of the device, in the example, as described above in FIG. 7, the extending lengths at the front and back sides of the device in the extraction time are set to be different. Namely, for the purpose of including the vertically-placed use form and securing the image projection display performance of the device, in order to configure so that the device is arranged to be titled by only a small angle θ with respect to the image projection plane, each of the stand legs 5 and 5 has an inclination angle (θ) in the thickness direction thereof, and in the embodiment, in order to secure the stability at the device arrangement time, the length (L2) of the stand leg 5 extending at the side where the device main body is tilted is set to be larger than the length (L1) of the stand leg 5 extending at the side (left side of the figure) opposite to the side where the device main body is tilted (L1<L2). Particularly, the length (L2) of the stand leg 5 extending at the image projection plane side may be appropriately set within a range which the stand leg does not reach the image projection plane S (namely, excellent image projection display performance can be secured without distortion of the projection image).

In addition, more specifically, although the example where L1:L2=5:7 is exemplified in this example, the present invention is not limited thereto, but for example, the ratio can be considered to be appropriately set according to the inclination angle (θ).

In addition, it is obvious to the ordinarily skilled in the art that, in the structure of the example, as the length (L=L1+L2) of the pair of stand legs 5 attached integrally at the one side surface of the projection-type image display device, in consideration of the attachment position and structure (particularly, the stand legs not being protruded in the accommodation time), the half (=W/2) of the width W of the device illustrated in FIG. 1 is set as a maximum value and the height =H is set as a minimum value (that is, H<L<W/2). However, the present invention is not limited thereto, but for example, in the configuration where the pair of stand legs 5 are arranged mutually along one side surface of the device, the width of the device can be designed to be at maximum. Alternatively, in an extendable configuration, in the accommodation time, L=L1+L2 is set; and in the using time, the device may be used in the state that the stand legs are extended.

<Others>

In the projection-type image display device, in addition to the above-described stand legs and the like, particularly, a port plate 65 including ports such as a USB port, a VGA port, and an HMDI port for inputting an image signal from the outside (for example, a PC or a mobile terminal such as an iPhone or an iPad mini) of the device and a power inlet 6 into which the power cable is inserted are attached to the side surface of the lower case 2 constituting the main body 1.

For this reason, in the actual using time, a plurality of cables are connected to the side surface of the projection-type image display device. Particularly, in the "vertically-placed use form" where the device is used in the state that the pair of stand legs 5 and 5 are extracted and the device main body 1 is erected on the desk, in a case where a manipulator's finger is caught on such a cable, a force is exerted on the power inlet 6 or the port plate 65, so that there is considered a problem in that the projection-type image display device is moved (projection image is distorted) or turned over (projection image disappears).

In the embodiment, as illustrated above in FIG. 6 or FIG. 7, in the "vertically-placed use form", the port plate 65 and the power inlet 6 are attached at the lower positions of the device. Namely, in a case where the device is used in the state that the pair of stand legs 5 and 5 are extracted and the device main body 1 is erected, the port plate 65 or the power inlet 6 is disposed to be positioned to be close to the extracted stand legs 5 and 5.

According to the present invention, it is possible to provide a practically excellent projection-type image display device capable of changing an arrangement state appropriately according to a use situation by simple manipulation.

It should be noted that the present invention is not limited to the above-described embodiment, but various modified examples are available. For example, in the above-described embodiment, for the better understanding of the present invention, detailed description is made, but the present invention is not necessarily limited to having all the configurations described above. In addition, a portion of configurations of an embodiment may be replaced with other configurations, and configuration of an embodiment may be added with other configurations. In addition, with respect to a portion of configuration of an embodiment, addition, subtraction, replacement of other configurations may be available.

REFERENCE SIGNS LIST

1 Main body (frame)
2 Lower case
3 Upper case
31 Openable mirror cover
32 Reflecting mirror (freeform surface mirror)
35 Opening
5, 5 Stand legs
6 Power inlet
65 Port plate
102 Projection lens system
56 Sliding stopper/lock part
562 Ratchet mechanism
58 Wave washer (locking mechanism)
S Screen
T Table

The invention claimed is:

1. A projection-type image display device where an optical system, including at least a projection lens, and for emitting image light to be enlarged-projected is accommodated inside a frame configured with a lower case and an upper case and an enlarging projection means which enlarges-projects the image light emitted from the optical system toward a display plane is openably attached to a portion of the upper case of the frame, wherein the projection-type image display device can be installed by a bottom surface of the lower case or one side surface thereof, wherein a stand leg is accommodated integrally with the case and extractably in the one side surface of the lower case, wherein the stand leg has a form satisfying an installation condition for a vertically erected arrangement where the one side surface of the projection-type image display device becomes a bottom surface in the extracted state, and wherein the stand leg is formed with a member with a rectangular plate outer shape having a pair of surfaces with predefined inclination angles and is rotatably attached to the one side surface of the lower case.

2. The projection-type image display device according to claim 1, wherein the enlarging projection means which is openably attached to the portion of the upper case of the frame is a reflecting mirror having a reflecting surface having a freeform surface shape.

3. The projection-type image display device according to claim 1, wherein the stand leg has a length of which a maximum is equal to a width (=W) of the projection-type image display device and of which a minimum is equal to a height (=H) of the projection-type image display device.

4. The projection-type image display device according to claim 1, wherein a pair of the stand legs are provided, and each of the stand legs has a length of which a maximum is equal to a half (=W/2) of a width of the projection-type image display device and of which a minimum is equal to a height (=H) of the projection-type image display device.

5. The projection-type image display device according to claim 4, wherein the stand legs are configured so that, in the extracted state, a portion extending from the one side surface of the projection-type image display device toward the display plane and a portion extending toward the opposite side are different in length ($L_1$ and $L_2$).

6. The projection-type image display device according to claim 5, wherein, in a state that the projection-type image display device is arranged to be vertically placed, the length ($L_2$) of the portion of the stand legs extending from the one side surface of the projection-type image display device toward the display plane is set to be smaller than a distance from the one side surface to a portion where the display plane onto which the image light is to be enlarging-projected is started.

7. The projection-type image display device according to claim 4, wherein the stand legs are attached to the one side surface of the projection-type image display device through a ratchet mechanism.

8. The projection-type image display device according to claim 4, wherein the stand legs are attached to the one side surface of the projection-type image display device through a locking mechanism.

9. The projection-type image display device according to claim 1, further comprising a port connection portion to which a cable from an outside is connected, wherein the port connection portion is provided in a portion close to a lower portion, in a state where the projection-type image display device is arranged to be vertically placed, in a side surface adjacent to the one side surface of the lower case to which the stand leg is attached.

* * * * *